United States Patent [19]
Kobayashi et al.

[11] Patent Number: 5,092,428
[45] Date of Patent: Mar. 3, 1992

[54] DRUM BRAKE

[75] Inventors: Kinzo Kobayashi, Yokohama; Hideaki Ishii, Ichikawa; Masahiko Yamamoto, Koufu, all of Japan

[73] Assignee: Tokico Ltd., Kanagawa, Japan

[21] Appl. No.: 553,749

[22] Filed: Jul. 19, 1990

[30] Foreign Application Priority Data

| Jul. 21, 1989 | [JP] | Japan | 1-86314[U] |
| Jul. 24, 1989 | [JP] | Japan | 1-86677[U] |
| Jul. 29, 1989 | [JP] | Japan | 1-89583[U] |
| Oct. 17, 1989 | [JP] | Japan | 1-121124[U] |
| Nov. 9, 1989 | [JP] | Japan | 1-130673[U] |

[51] Int. Cl.⁵ ............................................ F16D 51/22
[52] U.S. Cl. ................................ 188/106 A; 188/326
[58] Field of Search ............ 188/106 P, 106 A, 106 F, 188/326, 328, 362

[56] References Cited

U.S. PATENT DOCUMENTS

| 2,404,054 | 7/1946 | Goepfrich | 188/106 A X |
| 3,666,058 | 5/1972 | Quiney | 188/106 A |
| 4,076,105 | 2/1978 | Aono | 188/106 A |
| 4,387,792 | 6/1983 | Imamura | 188/106 F X |

Primary Examiner—Matthew C. Graham
Assistant Examiner—Peter M. Poon
Attorney, Agent, or Firm—Oliff & Berridge

[57] ABSTRACT

A drum brake in which a parking brake is incorporated. A parking brake lever is mounted in the interior of a vehicle and is operable to pull a parking lever through a cable. The rotation of the parking lever causes a pair of brake shoes to be forced tightly against a brake drum. This results in the generation of a braking force. A stopper member is provided to limit the maximum angular position of the parking brake. This design prevents contact of the parking lever with a rotary shaft due to excessive pulling of the parking lever and thus damage of the rotary shaft as well as the parking lever.

6 Claims, 13 Drawing Sheets

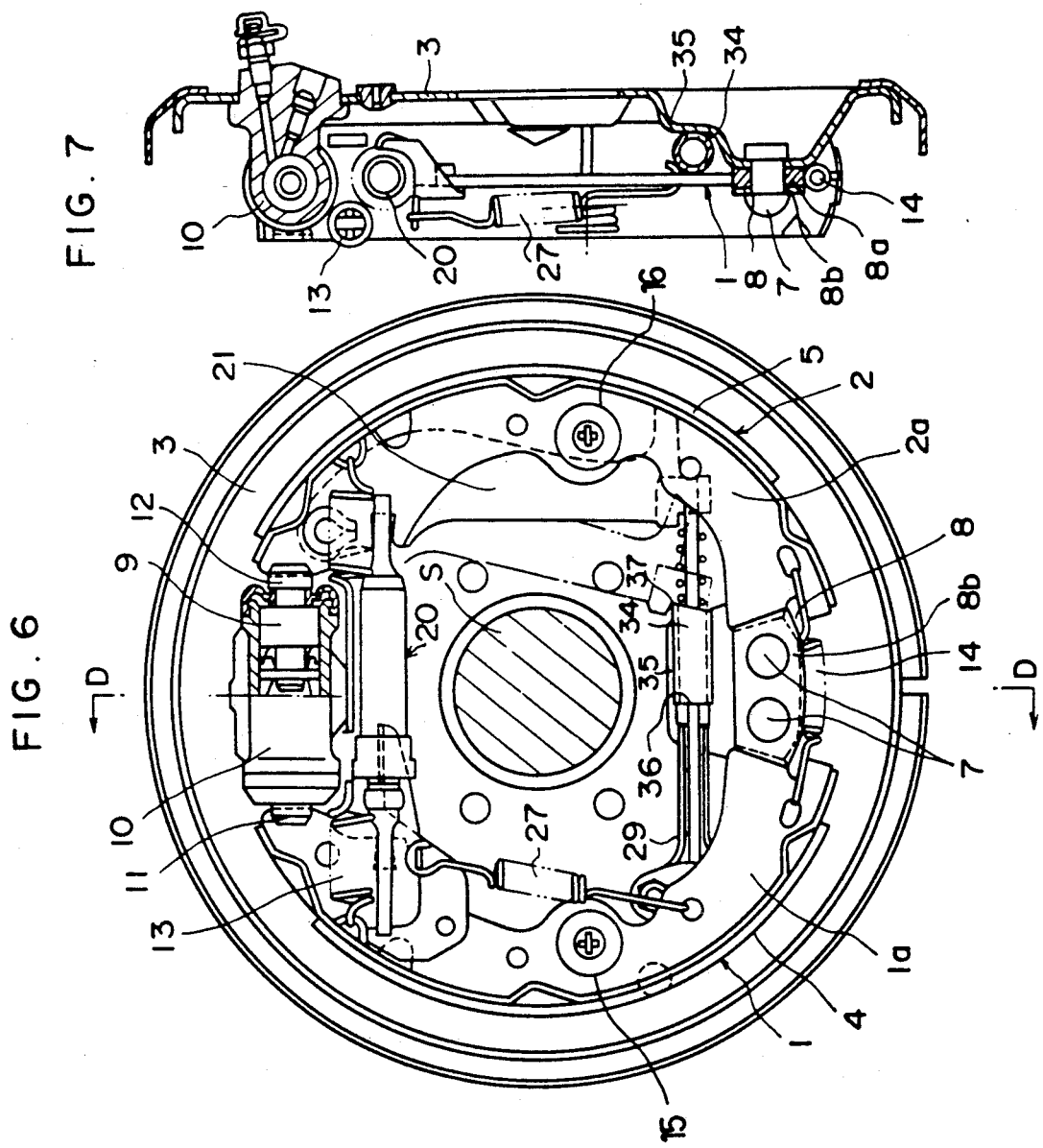

DRUM BRAKE

BACKGROUND OF THE INVENTION

1. Field of the Invention

The present invention relates to a drum brake in which a parking brake is incorporated.

2. Description of the Related Art

Some drum brakes include handbrakes or parking brakes used when a vehicle is parked. Such a drum brake is shown, for example, in FIGS. 26 to 28.

The conventional drum brake is commonly referred to as a leading and trailing shoe design and includes a backing plate 3 for attachment to a nonrotatable component (not shown) of a vehicle and having a mounting portion 6 projecting outwardly therefrom. An anchor 8 is fixedly mounted to the mounting portion 6 by means of rivets 7. A pair of shoes (one is a leading shoe 1, and the other is a trailing shoe 2) each have one end in sliding contact with the anchor 8. Two wheel cylinders 10 have pistons (only one is shown) 9,9 and piston rods 11, 12 secured to the pistons. The other end of each of the shoes 1, 2 are in engagement with the piston rods 11, 12. When oil under pressure is supplied to the wheel cylinders 10, the shoes 1, 2 are moved outwardly from the anchor 8.

A rotary shaft S, such as an axle shaft, extends centrally through the backing plate 3 and has a front end connected to a brake drum 19 and a wheel (not shown). There are predetermined clearances between the inner periphery of the brake drum 19 and the outer surfaces of the shoes 1, 2. A braking force is generated when the brake shoes 1, 2 are forced tightly against the inner periphery of the brake drum.

Reference is now made to the structure of a parking brake. A strut 20 also extends between each of the other ends of the shoes 1, 2 and includes a self-adjusting mechanism designed for the automatic adjustment of the clearances between the brake shoes 1, 2 and the brake drum 19. A lever 21 has one end pivotably connected to the other end of the trailing shoe 2 and is engaged with the strut 20. The other end of the lever 21 is connected through a parking brake cable 23 to a parking brake lever mounted in the interior of the vehicle (not shown).

With this arrangement, the parking brake lever is operative to rotate the lever 21 through the cable 23. The strut 20 is then pressed toward the leading shoe 1. This forces the leading shoe 1 tightly against the brake drum 19.

As shown in FIG. 28, the self-adjusting mechanism includes an adjusting screw 25a extending from a rod 25 of the strut 20, and an adjusting gear 26a extending from another rod 26 and meshed with the adjusting screw. Rotation of the adjusting gear 26a causes the strut 20 to extend. An adjusting lever 28 is meshed with adjusting teeth formed on the adjusting gear 26a and is rotatable therewith when the shoes 1, 2 are forced against the brake drum under the action of a return spring 27 (see FIG. 26).

The prior art drum brake, however, includes no means for limiting the maximum angular position of the parking lever 21. It is for this reason that when the parking brake lever is excessively pulled, the lever 21 is rotated to come into contact the rotary shaft S. This results in the damage of the rotary shaft S and the formation of rust, or the lever 21 may be bent and malfunctions.

SUMMARY OF THE INVENTION

It is an object of the present invention to provide a drum brake which overcomes the problems encountered in the prior art drum brake and which avoids undesirable contact of a parking lever with a rotary shaft and the resultant damage by limiting the maximum angular position of the parking lever.

The drum brake of the present invention is characterized by a stopper means for limiting the maximum angular position of a parking lever.

The stopper means, for example, comprises a projection extending outwardly from a backing plate and integral with a mounting portion to which an anchor is mounted to support one end of each of the leading and trailing shoes. The stopper means may alternatively be in the form of a second guide member located at one end of a first guide member which is, in turn, mounted to the backing plate to guide a cable. Also, the stopper means may comprise a stopper member mounted integrally or separately to the front side of the backing plate. When a parking brake lever is operated to pull the parking lever through the cable, the parking lever comes into contact with the stopper means. In this way, the maximum angular position of the parking lever is limited. Therefore, bending or damage of the parking lever, as a result of contact of the parking lever with a rotary shaft is prevented.

Still alternatively, the stopper means may comprise a positioning portion formed at the parking lever where it is connected to the cable and a stopper portion provided at the backing plate. When the parking lever is rotated, the positioning portion is brought into contact with the stopper portion. In such a way, contact of the parking lever with the rotary shaft is prevented. Since the positioning portion is provided at a portion of the parking lever most remote from the pivot connection, a reaction force applied from the stopper portion is less than the case in which the positioning portion is provided at any other portion of the parking lever. Thus, bending of the parking lever due to contact with the stopper portion is avoided.

Further, the stopper means may comprise a positioning portion extending from the parking lever toward one of the brake shoes, and a stopper portion with which the positioning portion comes into contact during rotation of the parking lever. A contact area of the stopper portion with the parking lever is located between the parking lever and the backing plate. In this way, the maximum angular position of the parking lever is determined when the parking lever is contacted with the stopper portion. Also, such a contact area of the stopper portion is located between the parking lever and the backing plate, the parking lever can be guided by one of the brake shoes and the stopper portion. This design ensures proper operation of the parking brake if the parking lever is deflected during rotation. In case that the positioning portion extends in a direction opposite to the direction of rotation of the parking lever by the cable and is bent toward the backing plate, the parking lever may be moved toward the backing plate due to the loosening of the pivot connection or deflection of the parking lever per se since the parking lever is pulled by the cable at a portion most remote from the pivot connection. In the present invention, the parking lever is held in sliding contact with the stopper portion. Thus, the parking lever will never be moved toward the backing plate and can be operated smoothly to prevent a malfunction of the parking brake.

BRIEF DESCRIPTION OF THE DRAWINGS

A better understanding of the invention may be had by reference to the following description of preferred embodiments when taken in conjunction with the accompanying drawings, in which:

FIG. 6 is a front view of the drum brake according to a third embodiment of the present invention;

FIG. 7 is a sectional view taken along the line D—D of FIG. 6;

DESCRIPTION OF THE PREFERRED EMBODIMENTS

Figure 26:
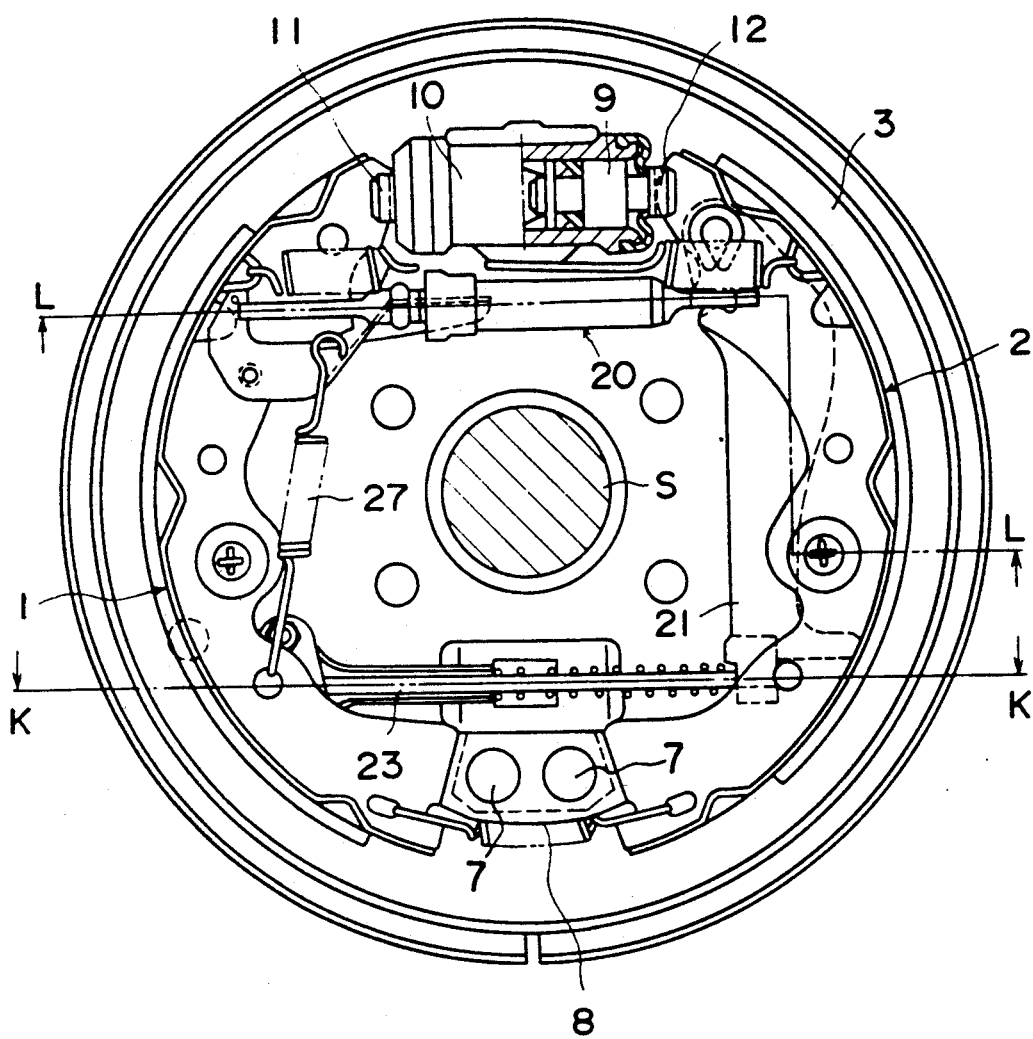
FIG. 26 is a front view of a conventional drum brake.
Figure 27:
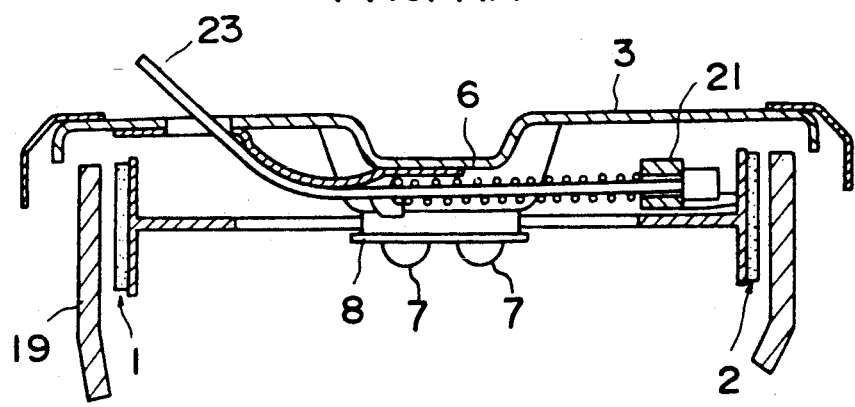
FIG. 27 is a sectional view taken along the line K—K of FIG. 26.
Figure 28:
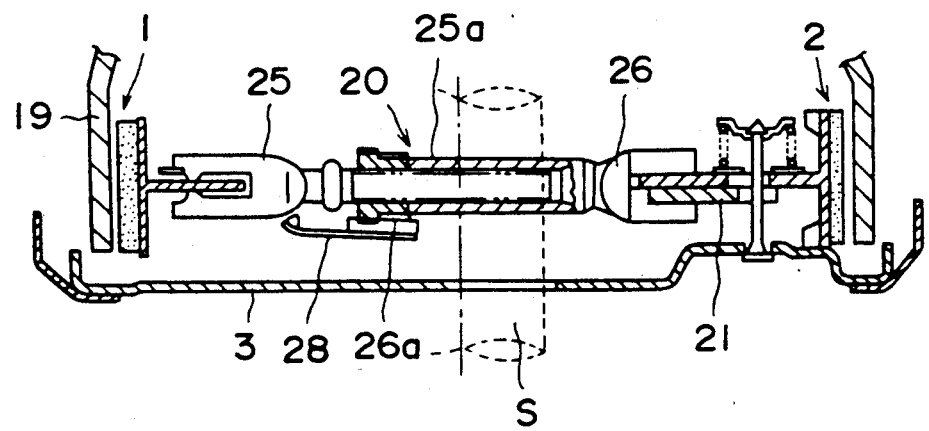
FIG. 28 is a sectional view taken along the line L—L of FIG. 26.

The present invention will now be described by way of example with reference to the drawings. Like reference numerals designate like or corresponding components of a conventional drum brake shown in FIGS. 26 to 28.

Figure 1:
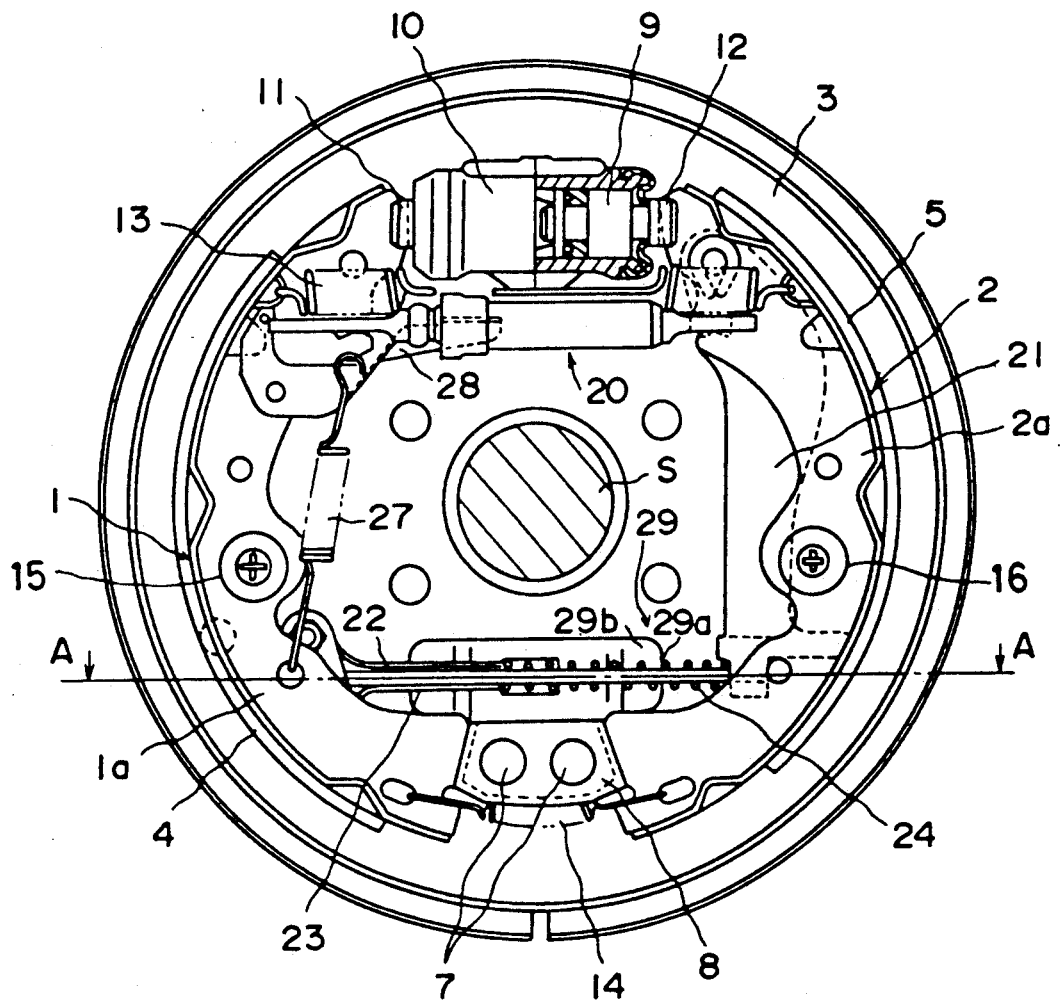
FIG. 1 is a front view of a drum brake according to a first embodiment of the present invention.
Figure 2:
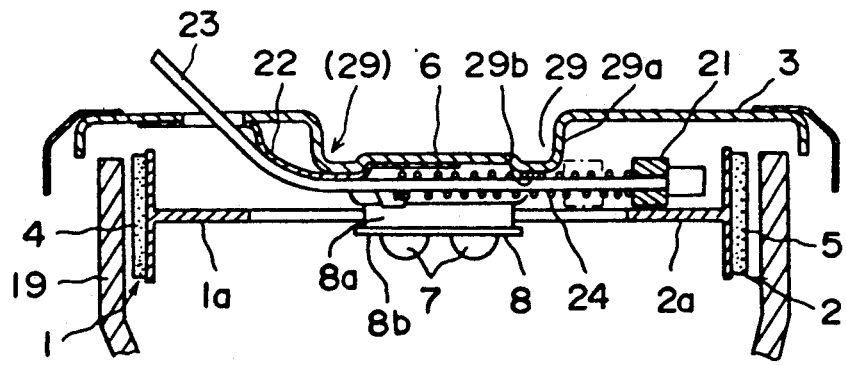
FIG. 2 is a sectional view taken along the line A—A of FIG. 1.
Figure 3:
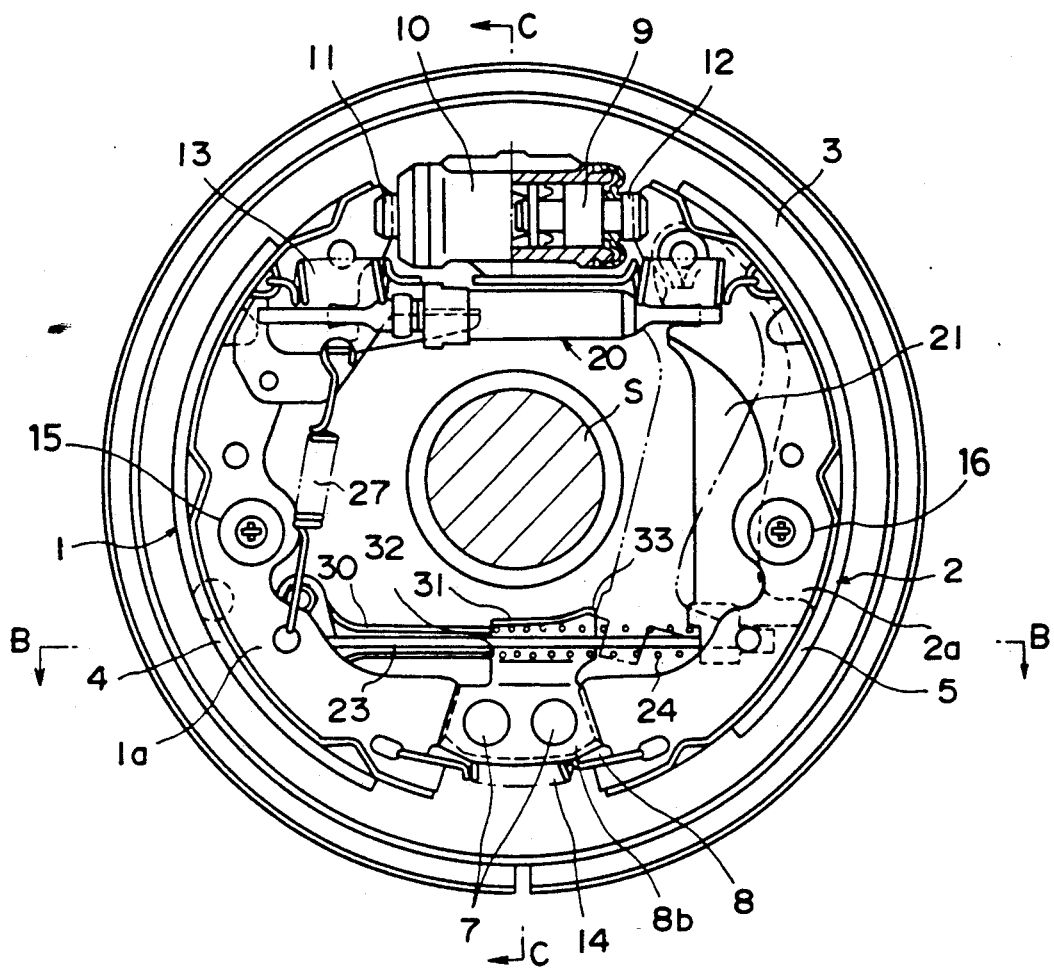
FIG. 3 is a front view of the drum brake according to a second embodiment of the present invention.
Figure 21:
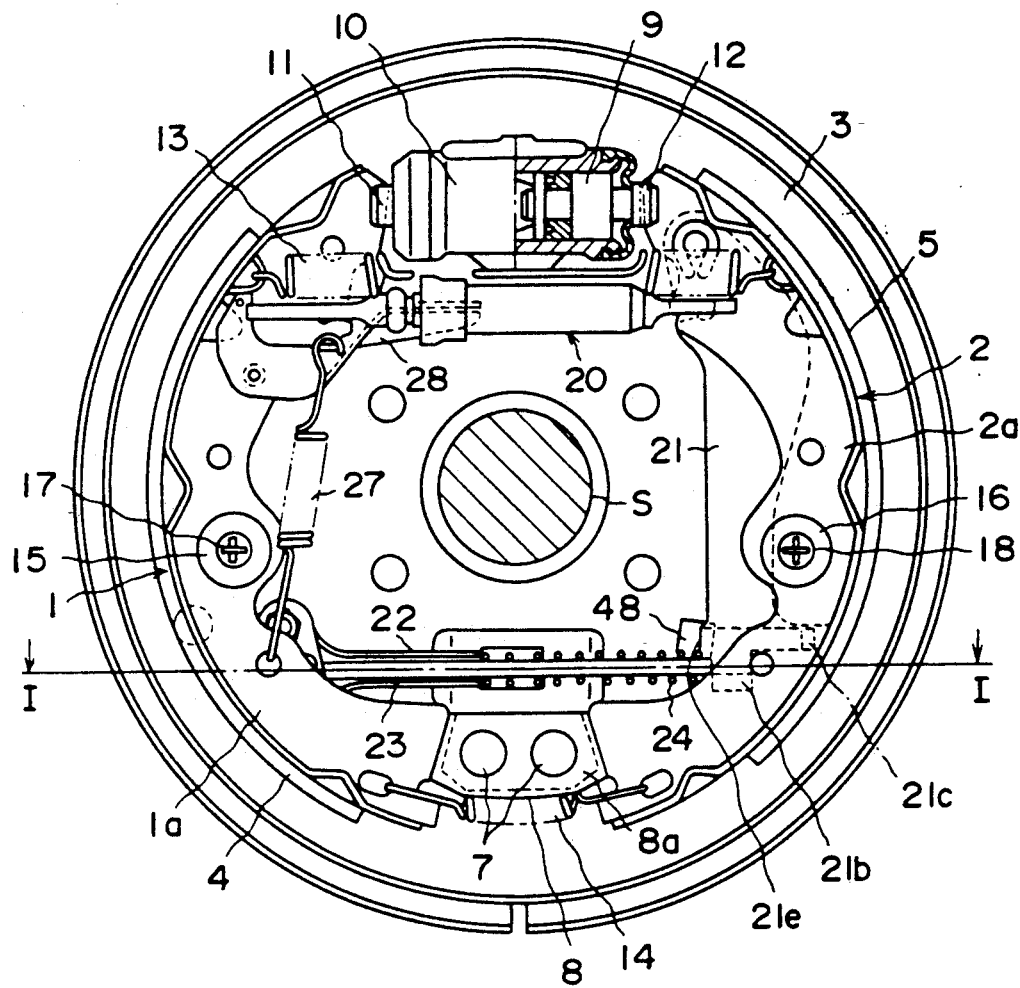
FIG. 21 is a front view of the drum brake according to a seventh embodiment of the present invention.
Figure 22:
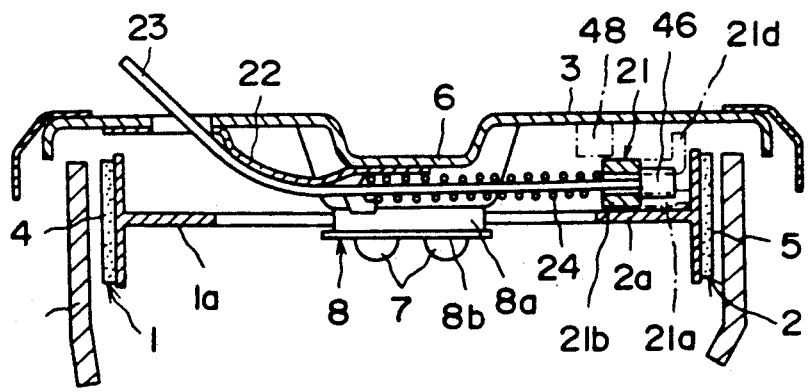
FIG. 22 is a sectional view taken along the line I—I of FIG. 21.
Figure 23:
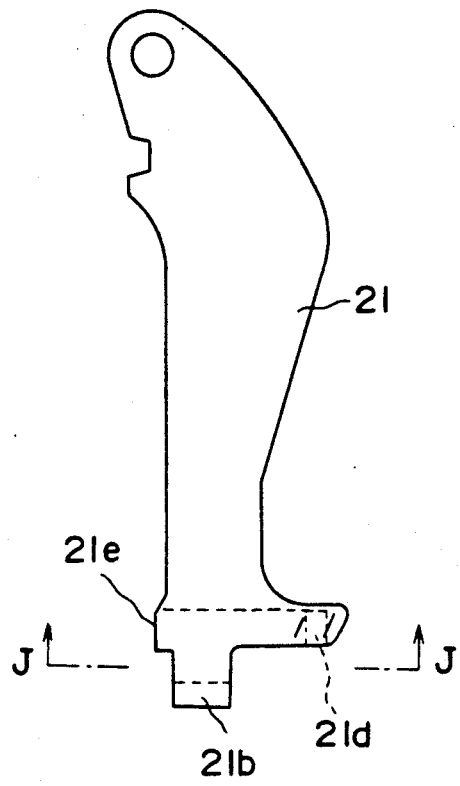
FIG. 23 is a front view of a parking lever as shown in FIG. 21.
Figure 24:
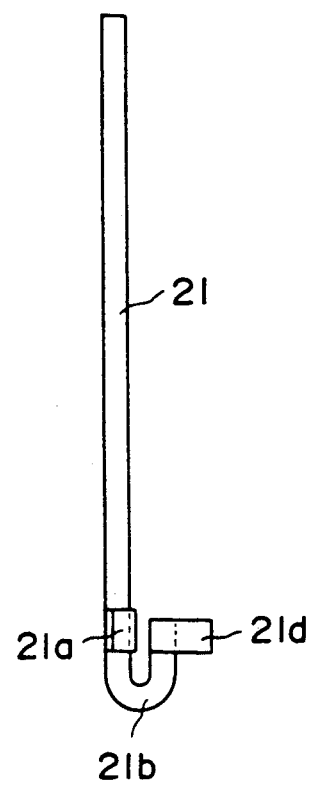
FIG. 24 is a right side view of the parking lever.
Figure 25:
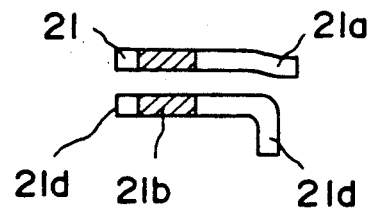
FIG. 25 is a sectional view taken along the line J—J of FIG. 23.

With reference to FIGS. 1 to 3, there is illustrated a leading-trailing shoe type drum brake which includes a backing plate 3 fixed to a nonrotatable part of a vehicle (not shown), and leading and trailing shoes 1 and 2 both mounted to the backing plate 3. The leading and trailing shoes 1 and 2 have linings 4 and 5 attached thereto and webs 1a and 2a extending inwardly therefrom. A mounting portion 6 projects from the front side of the backing plate 3. An anchor 8 is fixedly mounted to the mounting portion 6 and includes an anchor body 8a and an anchor plate 8b secured to the anchor body 8a. The leading and trailing shoes 1 and 2 each have one end in sliding contact with the anchor body 8a and their other end engaged with piston rods 11 and 12 which are, in turn, attached to respective pistons 9 (only one is shown) in two wheel cylinders 10. Two return springs 13 and 14 extend between ends of the leading and trailing shoes 1 and 2 so as to urge the leading and trailing shoes 1 and 2 in a direction away from the drum. With this arrangement, when oil under pressure is supplied to the wheel cylinders 10, the brake shoes 1 and 2 are moved radially outwards. Springs are also used to urge the leading and trailing shoes 1 and 2 toward the backing plate 3. With reference specifically to FIG. 21, reference numerals 15, 16 designate shoe holding springs supported by pins 17, 18 and designed to urge the leading and trailing shoes 1 and 2 towards the backing plate 3.

A rotary shaft S, such as a vehicular axle shaft, extends centrally through the backing plate 3. The brake drum 19 and a wheel (not shown) are secured to one end of the rotary shaft S. There is a predetermined clearance between the inner periphery of the brake drum 19 and each of the leading and trailing shoes 1 and 2. A braking force is created when the leading and trailing shoes 1 and 2 are forced tightly against the inner periphery of the brake drum 19.

Reference will now be made to a parking brake. The parking brake includes a strut 20 which has a self-adjusting mechanism for adjusting the clearances between the brake drum 19 and the leading and trailing shoes 1 and 2 as in the conventional drum brake. A parking lever 21 has one end pivotally connected to one end of the trailing shoe 2 and is engaged with the strut 20. The other end of the parking lever 21 is connected to a parking brake lever (not shown) mounted in the interior of a vehicle through a cable 23 which is, in turn, guided by a guide member 22. Disposed between the parking lever 21 and the guide member 22 is a return or coil spring 24 through which the cable 23 extends. When the parking lever 21 is returned to its initial position under the action of the coil spring 24, it is held in position by a projection 21a which extends unitarily from the other end of the parking lever 21.

By this arrangement, when the parking brake lever is operative to rotate the parking lever 21 by means of the cable 23, the strut 20 is urged toward the leading shoe 1. This causes the leading shoe 1 to come into hard contact with the brake drum 19. The trailing shoe 2 is then forced tightly against the brake drum 19 by a reaction force.

Reference will next be made to a stopper means for limiting the maximum angular position of the parking lever 21. This stopper means is an essential feature of the present invention.

With reference to FIGS. 1 and 2, there is shown stopper means made according to a first embodiment of the presnet invention.

The mounting portion 6 extends outwardly (downwardly in FIG. 2) from the front surface of the backing plate 3. A stopper portion 29, as stopper means, projects from the backing plate 3 and is integral with the mounting portion 6. The stopper portion 29 has a contact area 29a with which the parking lever 21 comes into contact. The contact area 29a extends vertically and symmetrically from the backing plate 3. The contact area 29a has such a height that the parking lever 21 can come into contact therewith upon rotation of the parking lever 21, and the return spring 24 can extend between an upper surface 29b and the cable 23. Also, the stopper portion 29 is so positioned as to stop the parking lever 21 before the parking lever 21 comes into contact with the rotary shaft S. Such a position is the maximum angular position of the parking lever 21.

With this arrangement, even if the parking lever is pulled to an excessive extent, the stopper portion 29 serves to limit the rotative movement of the parking lever 21. This prevents the parking lever 21 to come into contact with the rotary shaft S and thus damage or bending of the parking lever.

The return spring 24 is placed between the cable 23 and is restrained by the upper surface 29b of the stopper portion 29. This design prevent the return spring 24 from being bent while the cable 23 is repeatedly used. The cable 23 can thus be smoothly moved and a malfunction of the parking brake lever is prevented. In addition, this prevents vibrations of the return spring 24 per se and consequently damage of the same.

As earlier stated, the stopper portion 29 projects unitarily from the backing plate 3. The stopper portion 29 and the mounting portion 6 can, therefore, be manufactured together by a press. The stopper portion 29 is also symmetrical, so that the backing plate 3 can be commonly used for right and left drum brakes. This design reduces the cost of the product.

Other embodiments of the drum brake will hereinafter be described. However, reference will be made only to the stopper means in that the remaining components of the drum brake are identical to those explained in connection with the foregoing embodiment. The remaining components will be given the same reference numerals as used in FIGS. 1 and 2, and will not be explained.

Figure 4:
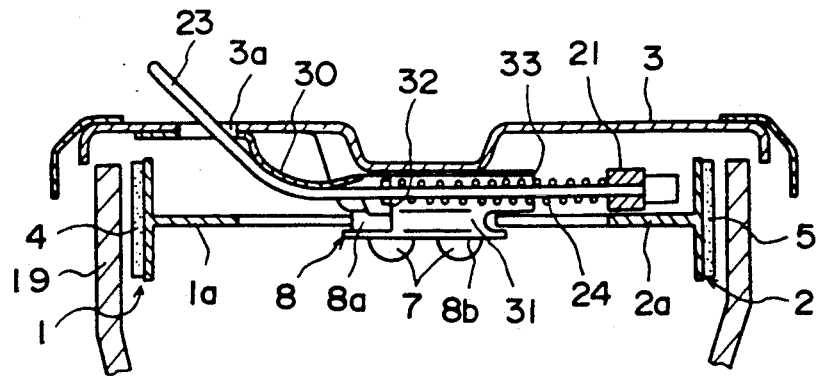
FIG. 4 is a sectional view taken along the line B—B of FIG. 3.
Figure 5:
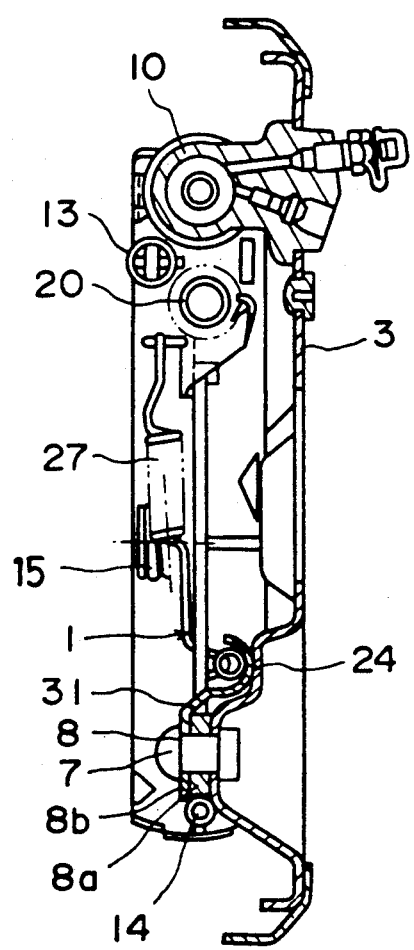
FIG. 5 is a sectional view taken along the line C—C of FIG. 3.

With reference to FIGS. 3 to 5, there is shown stopper means for use in the drum brake made according to a second embodiment of the present invention.

The backing plate 3 has an opening 3a through which the cable 23 extends to provide connection between the parking brake lever and the parking lever 21. A first guide member 30 is located adjacent to the opening 3a so as to guide the cable 23. The first guide member 30 is arcuate in section and slightly larger in diameter than the cable 23. A second guide member 31 is provided at one end of the first guide member so as to guide the cable 23 and extends from an anchor plate 8b of the anchor 8. This second guide member 31 is arcuate in section and slightly larger in diameter than the return spring 24. A step is formed between the first guide member 30 and the second guide member 31 and provides a spring seat 32. The return spring 24 is disposed between the spring seat 32 and the parking lever 21. The anchor plate 8b may be a separate member and fixed to the anchor 8 by the rivets 7.

A stopper portion 33, as stopper means, limits or determines the maximum angular position of the parking lever 21 and is integrally formed with the second guide member 31. The stopper portion 33 is so positioned that the parking lever 21 can be stopped before it comes into contact with the rotary shaft S. This position of the parking lever 21 is the maximum angular position.

This arrangement can prevent damage of the rotary shaft S and bending of the parking lever 21 since the rotative movement of the parking lever 21 is limited by the stopper portion 33 before it comes into contact with the rotary shaft S, as in the first embodiment.

The first guide member 30 and the second guide member 31 cooperate to guide the whole cable 23 in the drum brake, except that moved by the stroke of the parking lever 21. This positively avoids loosening of the cable 23 and facilitates operation of the same. The second guide member 31 prevents bending of the return spring 24 to ensure smooth movement of the cable 23 as well as smooth operation of the parking brake. Also, vibrations and thus, damage of the return spring 24 per se is eliminated.

FIGS. 6 and 7 show an alternative form of stopper means. A second guide member 34 is cylindrical and mounted on a support portion 35 which in turn, projects from the backing plate 3. The return spring 24 can extend through the second guide member 34. A step is formed between the first guide member 30 and the second guide member 34 and provides a spring seat 36 for the return spring 24. A stopper portion 37 is provided at one end of the second guide member 34 adjacent to the parking lever 21 and is in the from of an inclined surface. The stopper portion 37 serves to determine the maximum angular position of the parking lever and is positioned in such a manner that the parking lever 21 can be stopped before it comes into contact with the rotary shaft S.

Figure 8:
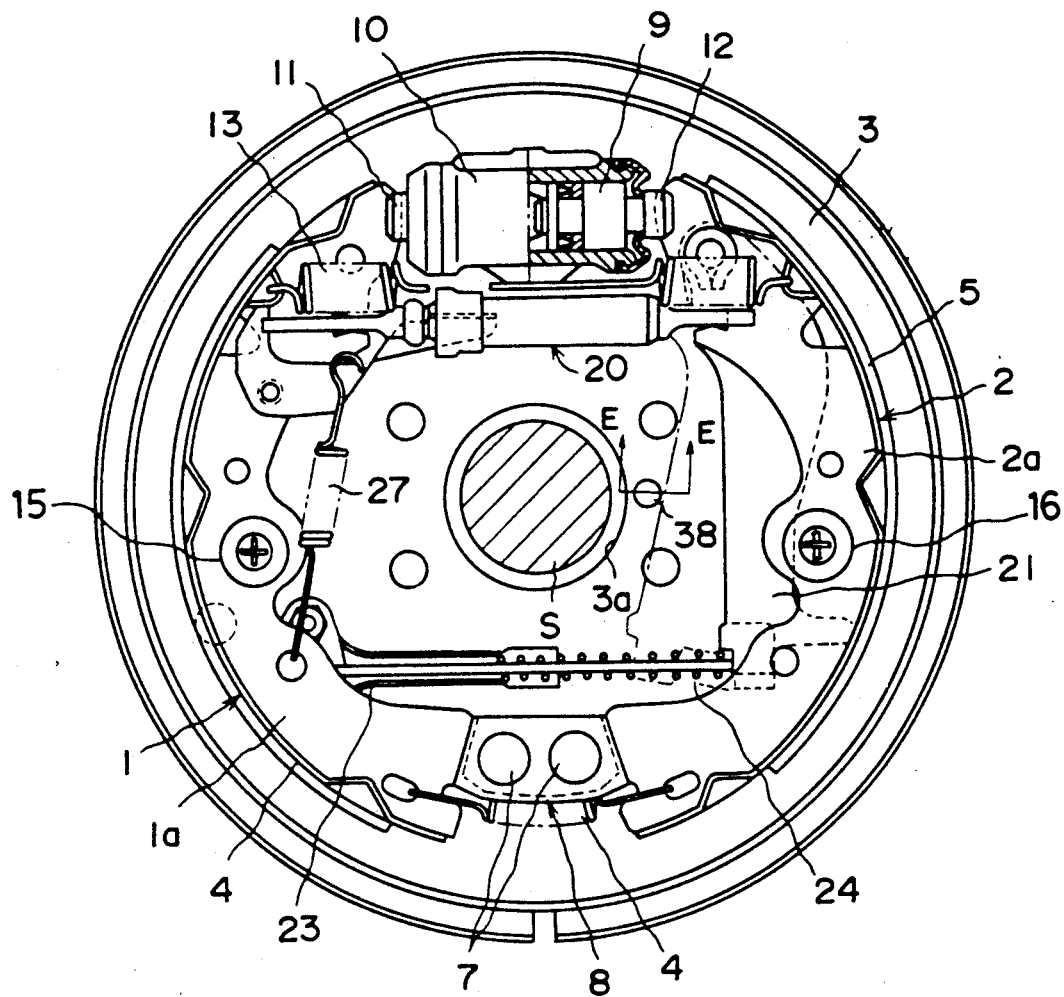
FIG. 8 is a front view of the drum brake according to a fourth, embodiment of the present invention.
Figure 9:
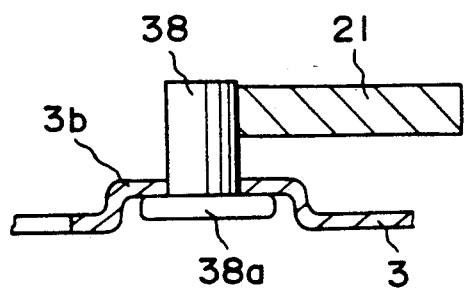
FIG. 9 is a sectional view taken along the line E—E of FIG. 8.

With reference to FIGS. 8 and 9, there is shown another form of stopper means for use in the drum brake made according to a third embodiment of the present invention.

A convex portion 3b projects outwardly from the backing plate 3 adjacent to the opening 3a through which the rotary shaft S extends. A pin 38 as stopper means projects outwardly through the convexed portion 3b and has a head portion 38a welded to the backing plate 3.

The pin 38 is so positioned that the parking lever 21 can be stopped before it comes into contact with the rotary shaft S. Such a position is the maximum angular position of the parking lever 21. The pin 38 also projects from the surface of the backing plate 3 so that the parking lever 21 can contact the pin 38 upon rotation.

Figure 10:
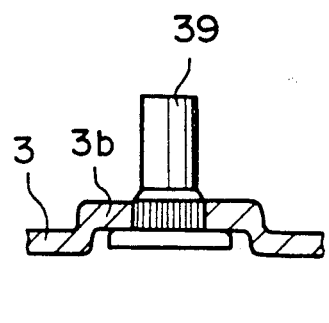
FIGS. 10 and 11 are vertical sectional views of modifications applicable to stopper member as shown in FIG. 9.
Figure 11:
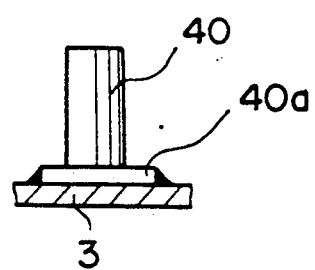

Illustratively, the pin 38 is welded to the backing plate 3. Alternatively, a pin 39 projects outwardly from the backing plate 3 and may be fixed thereto by caulking as shown in FIG. 10. Still alternatively, a pin 40 has a head 40a which may be welded to the upper surface of the backing plate 3 as shown in FIG. 11.

Figure 12:
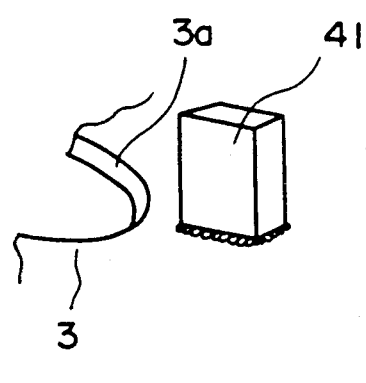
FIGS. 12 and 13 are vertical sectional views of further modifications applicable to stopper member as shown in FIG. 9.
Figure 13:
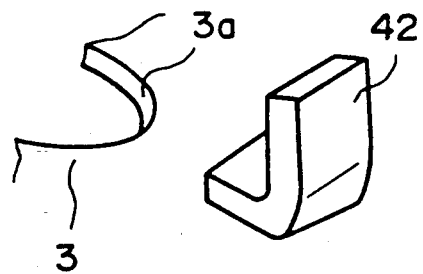

As shown in FIG. 12, stopper means may comprise a rod 41 having a rectangular section and welded to the upper surface of the backing plate 3. As shown in FIG. 13, stopper means may comprise a L-shaped member 42 welded to the upper surface of the backing plate 3.

By this arrangement, the pin 38 serves to limit the maximum angular position of the parking lever 21, and contact of the parking lever 21 with the rotary shaft S is prevented if the parking lever 21 is pulled to an excessive extent.

If the cable 23 is pulled after the parking lever 21 has been brought into contact with the pin 38, the parking lever 21 is rotated about the pin 38. This causes the trailing shoe 2 to move into hard contact with the brake drum 19 and thus, ensures sufficient braking by the parking brake.

Figure 14:
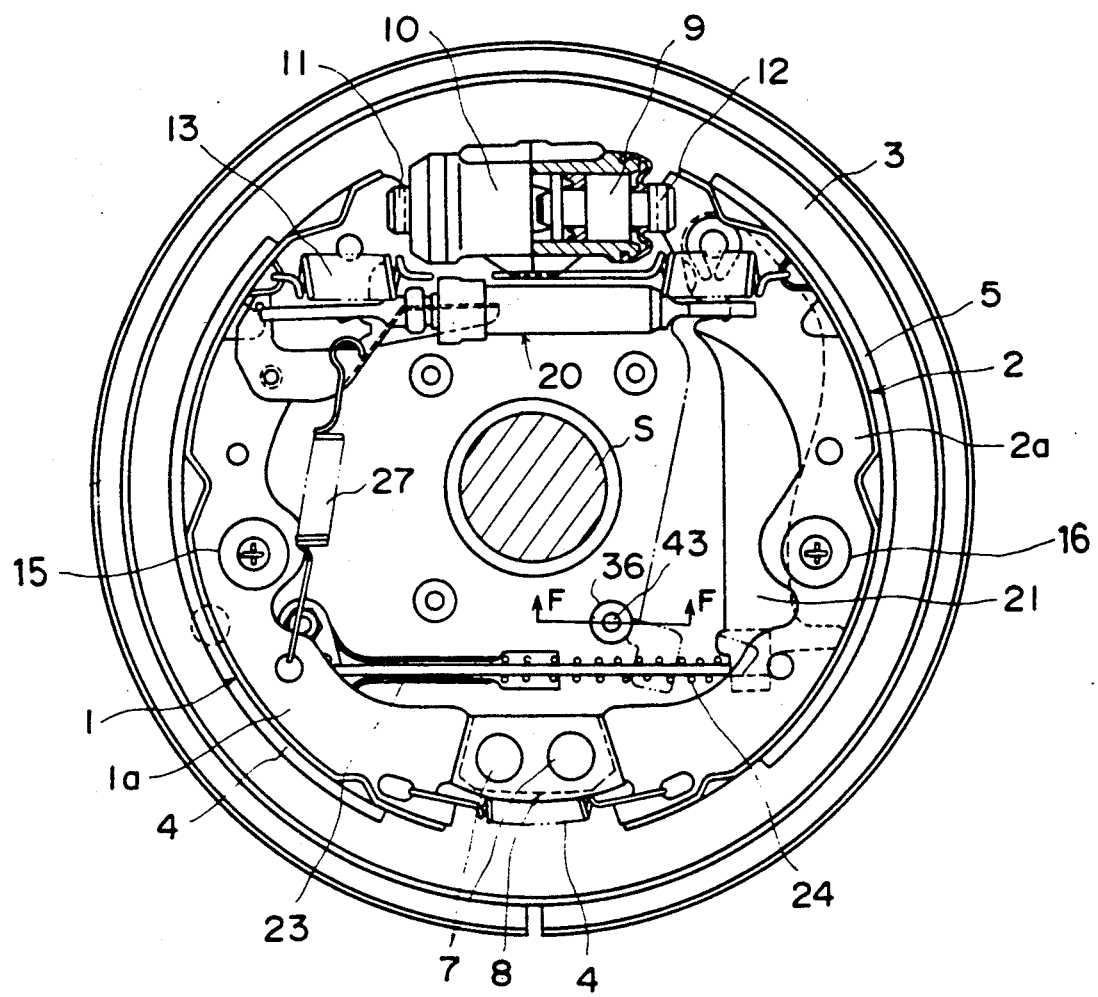
FIG. 14 is a front view of the drum brake according to a fifth embodiment of the present invention.
Figure 15:
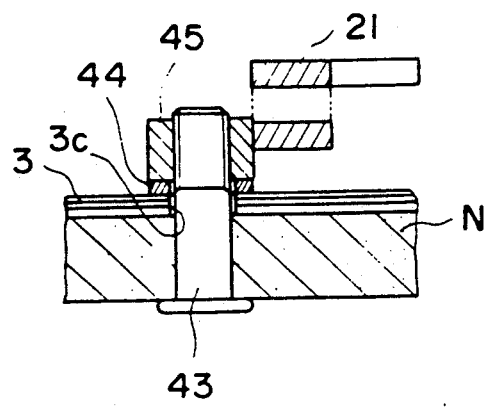
FIG. 15 is a sectional view taken along the line F—F of FIG. 14.
Figure 16:
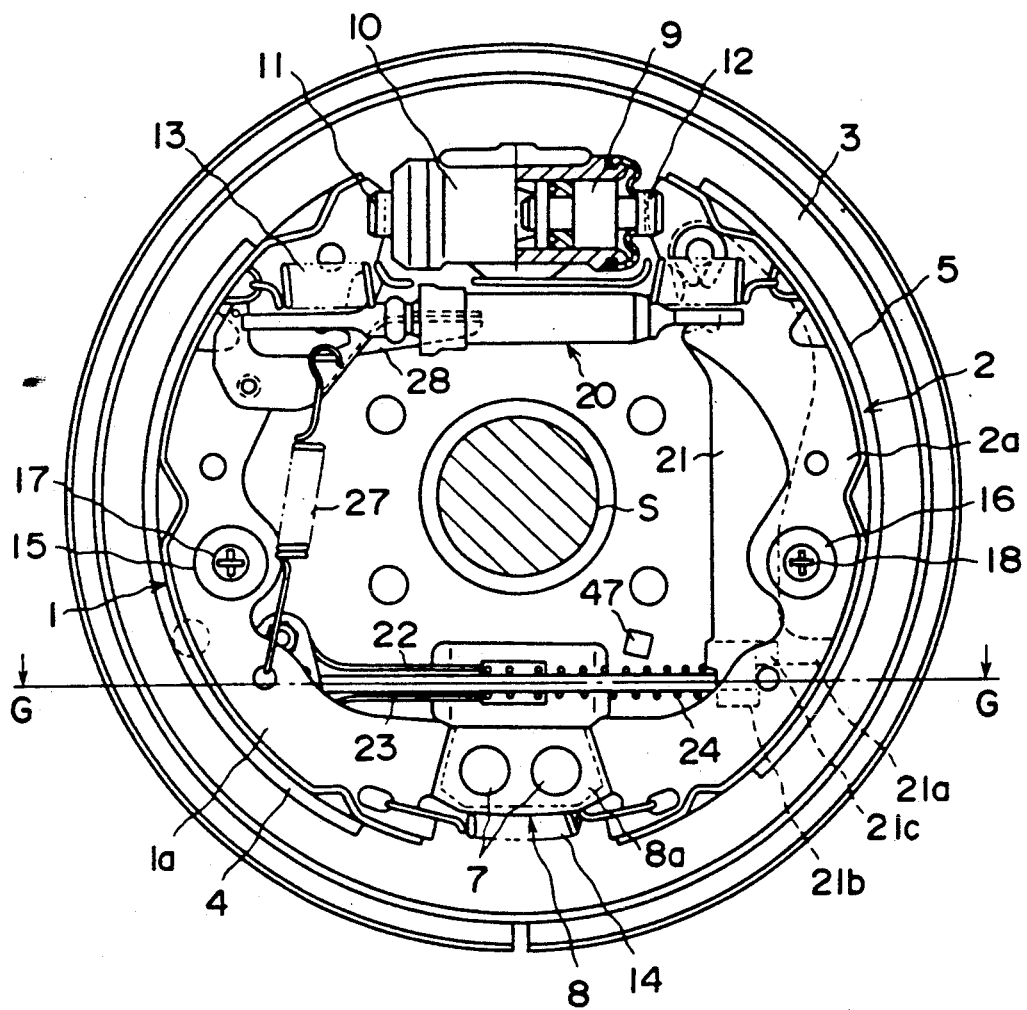
FIG. 16 is a front view of the drum brake according to a sixth embodiment of the present invention.
Figure 17:
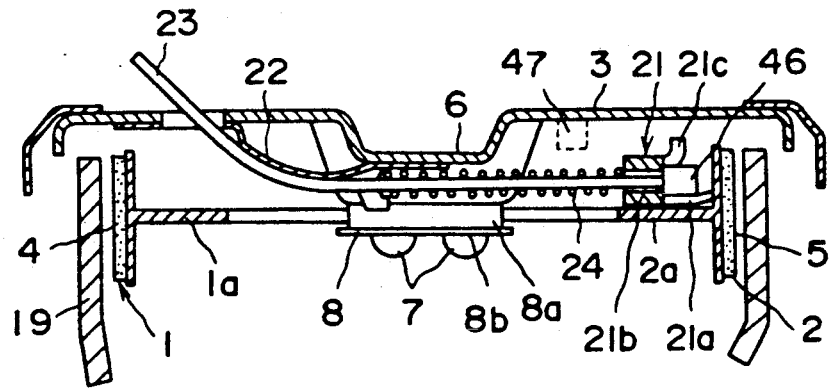
FIG. 17 is a sectional view taken along the line G—G of FIG. 16.
Figure 18:
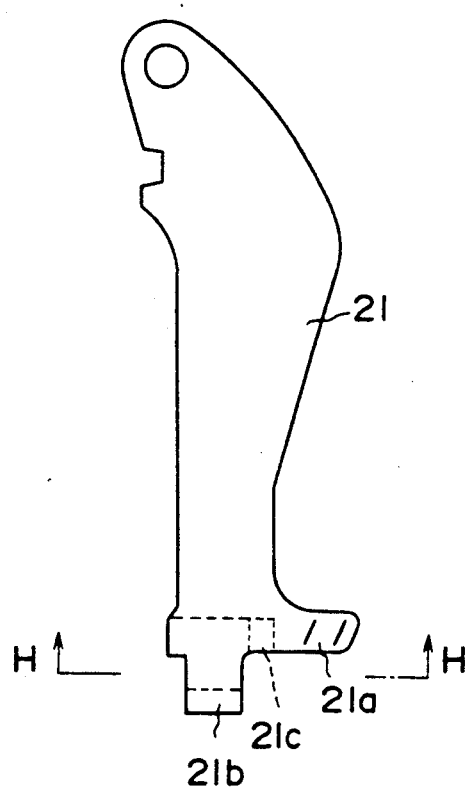
FIG. 18 is a front view of a parking lever.
Figure 19:
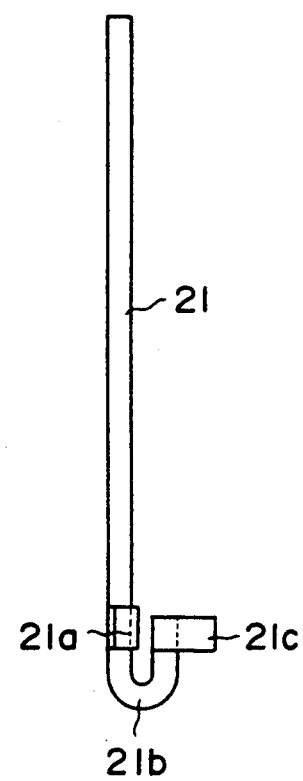
FIG. 19 is a right side view of the parking lever as shown in FIG. 18.
Figure 20:
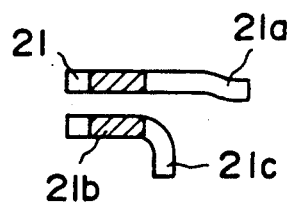
FIG. 20 is a sectional view taken along the line H—H of FIG. 18.

FIGS. 14 and 15 show another form of stopper means. This stopper means comprises a bolt or a nut for securing the backing plate to a nonrotatable element (for example, a knuckle) of a vehicle.

Specifically, a bolt 43 is fixed to a nonrotatable element N and extends through an opening 3c of the backing plate 3. A nut 45 is then tightened via a washer 44 against the nonrotatable element N so as to fix the backing plate 3 to the element N.

Four bolts and nuts are used to fix the backing plate 3. One of them (lower right hand corner in FIG. 14) is so positioned that the parking lever 21 can be stopped before it comes into contact with the rotary shaft S. The put 45 is so sized that the parking lever 21 can be brought into contact therewith during rotation. When the nut is located on the front side of the backing plate 3, then the bolt forms stopper means. In such a case, the head of the bolt serves to limit the rotative movement of the parking lever 21.

This design will not increase the number of components necessary for the manufacture of the drum brake since the stopper means is composed of the nut used to fixing the backing plate 3 and thus the cost of same as compared to a conventional drum brake.

FIGS. 16 through 20 show stopper means for use in the drum brake made according to a fourth embodiment of the present invention.

A U-shaped connecting portion 21b is formed at a free end of the parking lever 21 to engage a connecting portion 46 formed at one end of the cable 23. One end of the connecting portion 21b is bent toward the backing plate 3 to provide a positioning portion 21c. In the illustrated embodiment, the positioning portion 21c extends from one side (right side of the connecting portion 21b in FIG. 16) of the connecting portion 21b adjacent to the trailing shoe 2. Alternatively, the positioning portion 21c may extend from the opposite side (right side of the connecting portion 21b in FIG. 16) of the connecting portion 21b, or may be located between the both sides or may extend upwardly from the connecting portion 21b.

A stopper portion 47 is provided at the backing plate 3 whereby the parking lever 21 can be stopped before it comes into contact with the rotary shaft S. Illustratively, the stopper portion 47 is in the form of a block and welded to the backing plate 3. Alternatively, it may be fixed thereto by a screw. The stopper portion 47 may be in the form of a hexagon nut or bolt, or may be made by drawing process and extend unitarily from the backing plate 3. In any case, the positioning portion 21c and the stopper portion 47 together form stopper means.

Again, the stopper portion 47 serves to limit the maximum angular position of the parking lever 21, and contact of the parking lever 21 with the rotary shaft S is prevented if the parking lever 21 is excessively pulled.

A reaction force applied to the parking lever 21 from the stopper portion 47 is less when the positioning portion 21c is contacted with the stopper portion 47 so as to limit the position of the parking lever 21 than when any other portions of the parking lever 21 are contacted with the stopper portion 47. This design will eliminate deformation and damage of the parking lever 21.

FIGS. 21 through 25 show stopper means for use in the drum brake made according to a fifth embodiment of the present invention.

The U-shaped connecting portion 21b is formed at a free end of the parking lever 21 so as to engage a connecting portion 46 formed at one end of the cable 23. One end of the connecting portion 21b extends in a direction opposite to the direction in which the parking lever 21 is rotated by the cable 23 and is bent toward the backing plate 3 to provide a positioning portion 21d.

A stopper portion 48 is provided at the parking lever 21 so as to stop the parking lever 21 before it comes into contact with the rotary shaft S. The stopper portion 48 is so positioned that the flat rear surface of the parking lever 21 is always in sliding contact therewith during the rotation of the parking lever 21. Since the positioning portion 21d extends in a direction opposite to the direction in which the parking lever is rotated, a predetermined stroke of the parking lever 21 can be obtained while the parking lever 21 is always in sliding contact with the stopper portion 48.

Illustratively, the stopper portion 48 is in the form of a block and welded to the backing plate 3. Alternatively, it may be fixed thereto by a screw. The stopper portion 48 may also be in the form of a hexagon nut or bolt, or may be made by drawing process and extend unitarily from the backing plate 3. In any case, the positioning portion 21d and the stopper portion 48 together form stopper means.

With this arrangement, the rotative movement of the parking lever 21 is limited when the positioning portion 21d comes into contact with the stopper portion 48 of the backing plate 3 even if the parking lever 21 is pulled to an execess extent. Contact of the parking lever 21 with the rotary shaft S is thus prevented.

Since the parking lever 21 is pulled by the cable 23 at a portion most remotely from the pivot connection, if the pivot connection becomes loosened, the parking lever 21 may be deflected toward the backing plate 3, although deflection of the parking lever 21 in a direction away from the backing plate 31 is prevented by the web 2a of the trailing shoe 2. In the present invention, if the parking lever 21 is moved toward the backing plate 3 during rotation, the parking lever 21 comes into sliding contact with the stopper portion 48. In such a way, deflection of the parking lever 21 is prevented. Also, a side 21e of the parking lever 21 will never contact the stopper portion 48 before the positioning portion 21d does so as to ensure the proper operation of the parking brake.

The present invention has been applied to the drum brake wherein the leading and trailing shoes 1 and 2 are mounted to the anchor 8. It will be understood that the present invention is not limited to the illustrated embodiments and is applicable to any type of drum brakes wherein a parking brake includes a parking lever operable by a cable. Therefore, it will be understood that various changes and modifications may be made without departing from the spirit of the invention and the scope of the appended claims.

What is claimed is:
1. A drum brake comprising:
 a backing plate having a central opening for receiving a shaft, said backing plate adapted for attachment to a nonrotatable element of a vehicle;
 a pair of brake shoes movably mounted outwardly of said backing plate;

a brake drum mounted to a rotatable element of the vehicle, said pair of brake shoes being forced against said brake drum so as to generate a braking force;

a strut interposed between said pair of brake shoes;

a return spring of said brake shoes for urging the pair of brake shoes in the direction away from the drum;

a plane parking lever disposed between said backing plate and one of said brake shoes, said parking lever having one end rotatably supported by said one of said pair of brake shoes and the other end connected to a parking brake lever through a cable, said parking lever being active to move said pair of brake shoes by means of said strut toward said brake drum when the parking brake lever is operated to pull said cable;

a return spring for said parking lever wound around the cable and adapted to urge said parking lever in the direction of return wherein an engaging portion for said cable and said return spring of said parking lever is formed by bending the other end of said parking lever toward said backing plate, and a stopper member for defining the maximum rotation position of said parking lever provided projectingly from the back plate, said stopper member disposed near the return spring but between said central opening of the backing plate and the engaging portion of the parking lever such that the engaging portion of the parking lever contacts the stopper member to restrict rotation of the parking lever when the parking brake lever is rotated.

2. A drum brake as set forth in claim 1, wherein said portion bent toward the backing plate side of the engaging portion is in contact with the stopper member.

3. A drum brake as set forth in claim 2, wherein said engaging portion is formed in a U-letter-like shape.

4. A drum brake as set forth in claim 3, wherein the stopper member is used as a mounting member for mounting the backing plate to the nonrotatable element of vehicle.

5. A drum brake comprising:

a backing plate adapted for attachment to a nonrotatable element of a vehicle;

a pair of brake shoes movably mounted outwardly of said backing plate;

a brake drum mounted to a rotatable element of the vehicle, said pair of brake shoes being forced against said brake drum so as to generate a braking force;

a strut interposed between said pair of brake shoes;

a return spring of said shoes for urging the pair of shoes in the direction away from the drum;

a plane parking lever disposed between said backing plate and one of said brake shoes, said parking lever having one end rotatably supported by said one of said pair of brake shoes and the other end connected to a parking brake lever through a cable, said parking lever being active to move said pair of brake shoes by means of said strut toward said brake drum when the parking brake lever is operated to pull said cable;

a return spring of said parking lever wound around the cable and adapted to urge said parking lever in the direction of return, wherein said parking lever is disposed in such a manner that a flat plane surface of said parking lever is opposed to the backing plate, an engaging portion for attaching to the cable is formed at another end of said parking lever is provided with a positioning portion extending toward an opposite side to the direction in which said parking lever rotates by being pulled by said cable and the tip of which is bent toward said backing plate; and a stopper member provided projectingly on the backing plate so as to be in constant sliding contact with the flat plane surface during rotation of said parking lever and when abutted by said positioning portion defines a maximum rotation position of said parking lever.

6. A drum brake as set forth in claim 5, wherein the other end of the parking lever is bent toward the backing plate to form a U-letter-like shaped engaging portion and a position determining portion is provided on the portion extended from the portion bent toward the backing plate.

* * * * *